United States Patent

[11] 3,625,573

| [72] | Inventor | Jack Samuel Conn<br>Walton-on-Thames, England |
|---|---|---|
| [21] | Appl. No. | 878,071 |
| [22] | Filed | Nov. 19, 1969 |
| [45] | Patented | Dec. 7, 1971 |
| [73] | Assignee | Auto-Safe Limited<br>Richmond, Surrey, England |

[54] ANTITHIEF DEVICES
10 Claims, 5 Drawing Figs.

[52] U.S. Cl. ................................................... 303/89,
188/353, 200/61.86
[51] Int. Cl. ..................................................... B60t 17/16
[50] Field of Search ........................................... 188/152,
353; 303/89; 192/3, 3 H; 137/598; 200/61.86

[56] References Cited
UNITED STATES PATENTS

| 2,826,390 | 3/1958 | Bailey | 188/353 |
| 2,930,864 | 3/1960 | Novak | 200/61.86 |
| 2,574,821 | 11/1951 | Forman | 188/353 |
| 2,670,063 | 2/1954 | Reynolds | 303/89 UX |
| 2,701,035 | 2/1955 | Leichsenring | 188/353 |
| 3,116,752 | 1/1964 | Duncan | 188/353 |
| 3,515,442 | 6/1970 | Whittemore | 303/89 |

Primary Examiner—Milton Buchler
Assistant Examiner—John J. McLaughlin
Attorney—Mawhinney & Mawhinney ABSTRACT: In a hydraulic brake system of a vehicle having a master cylinder and brake cylinders, between the master cylinder and the brake cylinders, a device for preventing the unauthorized movement of the vehicle comprising essentially a device operable to act as a one-way valve to prevent return flow of brake fluid from the brake cylinders to the master cylinder, the one-way valve having a valve head of plastics material and including a pressure relief valve comprising a valve member spring urged against an aperture in said plastics valve head to permit passage of excess fluid from the brake cylinders to the master cylinder.

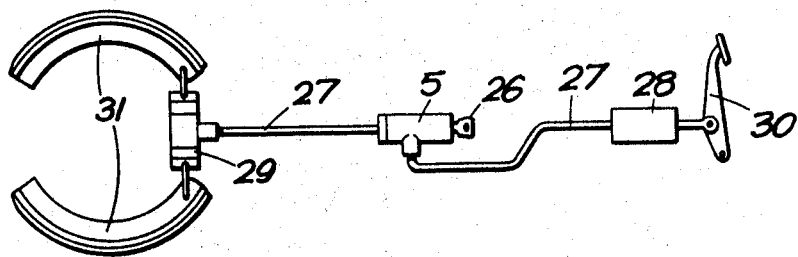
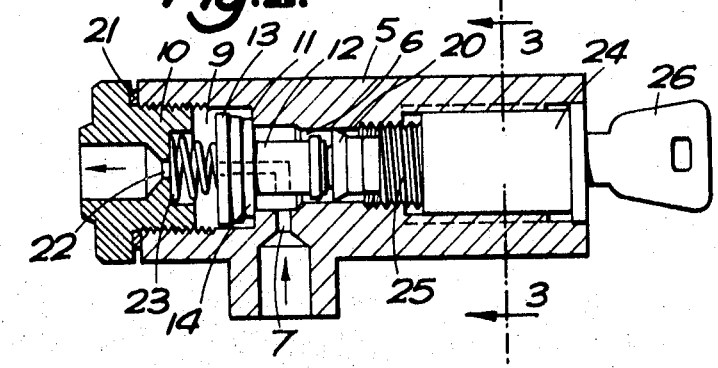
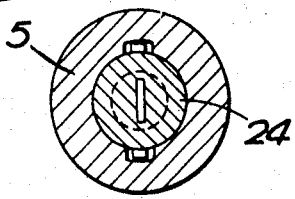
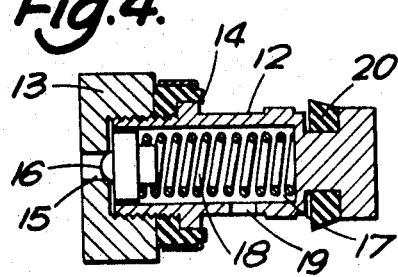

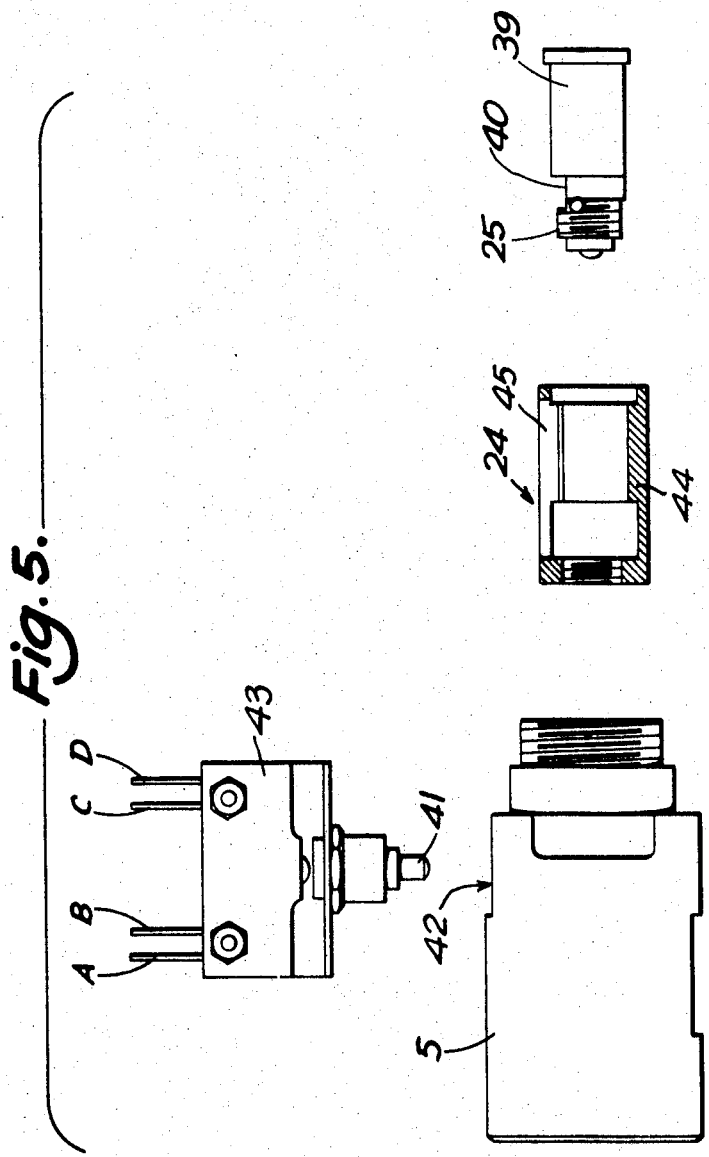

ANTITHIEF DEVICES

The invention relates to devices for incorporation in the hydraulic brake systems of vehicles having a master cylinder and brake cylinders, between the master cylinder and the brake cylinders of the system, to prevent the unauthorized movement of the vehicles.

It is known to provide, between the master cylinder and brake cylinders of the hydraulic brake system of a vehicle, a device which will normally permit flow of hydraulic fluid from master cylinder to brake cylinders and vice versa but which when operated by a key will act as a one-way valve preventing return flow of fluid from the brake cylinders to the master cylinder, hence locking the brakes and preventing unauthorized movement of the vehicle by someone who does not possess the requisite key.

It has been found that a disadvantage of such a device is that if the brake pedal of a system incorporating the device is accidentally or otherwise depressed a number of times while the device is acting as a one-way valve, the fluid pressure in the brake cylinders can be increased to a damaging level. It is therefore one object of the present invention to provide a device of the above kind incorporating within its valve member an improved safety valve which will open before a damaging pressure can be built up in the brake cylinders and permit flow of excess fluid back to the master cylinder.

It is a further object of this invention to provide such a safety valve which is particularly suited to operation within a hydraulic brake system.

Two particular embodiments of the invention will now be described by way of example, with reference to the accompanying drawings, in which:

FIG. 1 is a diagrammatic view of the device according to the invention incorporated in a hydraulic brake system;

FIG. 2 is a sectional elevation of the device according to the invention;

FIG. 3 is a section at 3—3 in FIG. 2;

FIG. 4 is a sectional elevation of the valve member of the device; and

FIG. 5 is an exploded view of a modified body portion and cylinder lock assembly.

The device shown in FIGS. 1 to 4 comprises a generally cylindrical body portion 5 having a through passageway 6 and a radial inlet 7 to the passageway intermediate the ends of the passageway.

The end 9 of the passageway is screw threaded and receives a screw screw-threaded plug 10, and the end 9 also has a valve seating 11. As may be seen from FIG. 1, the plug 10 communicates with the brake cylinders 29 (only one of which is shown) via conduit 27. Thus fluid may pass from the passageway 6 through an outlet passage 22 in the plug 10, to the brake cylinders.

Slidable within the passageway 6 is a valve member comprising a valve stem 12 and a valve head 13.

The underside of the valve head 13 has mounted thereon a sealing ring 14 which cooperates with the valve seating 11 to form a fluidtight seal therewith, when the valve head is seated on the seating as shown in FIG. 2.

The valve head comprises a plastic cap which screws onto the root portion of the valve stem 12 as shown in FIG. 4. In the valve head 13 there is a centrally formed aperture 15 in which seats a spherical part of a second valve member 16 for closing the aperture 15. The valve stem 12 is provided with an axial bore 17 which communicates with the aperture 15 and in which is located a compression spring 18 which normally retains the spherical part of valve member 16 in the aperture 15 to close the aperture.

The valve stem 12 has a radial hole 19 formed therein which communicates with the axial bore 17 and the passageway 6 in the body part 5.

The arrangement of the valve head 13 and the valve member 16 has been found to be critical. It is important that hydraulic brake systems work without having filters within the system, since any clogging of the filters would create undesirable back pressures. Consequently the hydraulic fluid generally has an appreciable content of solid particles and the like after a period of use, and such particles can easily build up around the aperture 15 to a sufficient extent to hold the member 16 away from the aperture and permit passage of fluid through the aperture. As will be appreciated from the description below, such action would cause the device to become inoperative, and the valve head 13 and valve member 16 arrangement is consequently of great importance.

Malfunction of the arrangement due to the above-mentioned cause is particularly prevalent with a metal-to-metal contact between valve member 16 and valve head 13. Attempts to use a resilient member 16 or a sealing ring were found unsatisfactory due to the high pressures involved and resultant deformation which affected the pressure at which valve member 16 would permit flow through aperture 15. Constructing the valve head or cap 13 of plastics material has been found to give good results, and an acetal resin or reinforced polyamide plastic have been found to give a particularly good blend of characteristics in that they are sufficiently rigid to withstand the demands placed upon them by the screw thread, and are sufficiently resilient to give good sealing properties with the member 16, without serious deformation. For example the plastics material known under the name "Delrin" may be used.

The valve stem 12 is provided with a packing 20 which forms a seal for the right-hand end of the passageway 6 between the end and the valve stem 12.

The screw-threaded plug 10 has mounted thereon a washer 21 to form a seal with the body part 5.

Located between the screw-threaded plug 10 and the valve head 13 is a compression spring 23 which normally retains the underside of the valve head 13 on its seating 11.

The right-hand end of the passageway 6 in the body 5 is enlarged to accommodate a cylinder lock 24, on the rear end of which is secured a screw-threaded spigot 25 which is rotatable with the cylinder of the cylinder lock and engages a complementary screw-threaded portion of the passageway 6.

The end of the screw-threaded spigot 25 normally abuts the end of the valve stem 12, when the valve head 13 is on its seating. The pitch of the screw thread on the spigot 25, is such as to permit rotation of the cylinder of the cylinder lock 24 by the key 26, which is removable, in one direction to advance the spigot 25 sufficient to move the valve head 13 off its seating 11, against the action of the compression spring 23, and in the reverse direction to withdraw the spigot.

The device is applied to the hydraulic brake system of a motor vehicle in the following manner:

The device is mounted on the dashboard of the vehicle or at any other convenient adjacent position, with the lock controlling key readily accessible.

The body 5 is mounted on, for instance, the dashboard of the vehicle. The pipe 27 (FIG. 1) leading from the master cylinder 28 to the usual four-way junction to which are connected the four pipes leading to the brakes of the four wheels of the vehicle, is disconnected and the pipe 27 is rerouted via the device on the dashboard. That is to say the pipe 27 leading from the master cylinder 28 is connected to the inlet port 7 of the body 5, while the continuation of the pipe 27 is coupled to the outlet port 22 of the device and the aforesaid junction (not shown), which in turn communicates with the brake-operating cylinders 29.

The operation of the device for the prevention of the unauthorized removal of the vehicle is as follows:

Normally the end of the screw-threaded spigot 25 is advanced by the rotation of the cylinder of the cylinder lock 24 by the key 26 to move the valve stem 12, which in turn moves the valve head 13 off its seating 11, against the action of the compression spring 23.

Thus when the brake pedal 30 is depressed to apply the brakes, fluid under pressure will pass from the master cylinder 28 to the cylinders 29 of the brakes on the wheels, to actuate the brake shoes 31, in the conventional manner. The flow of fluid being to the inlet 7 in the body 5 of the device, the passageway 6, past the valve head 13 which is held off its seating 11 by the spigot 25, through the outlet 22 and pipe 27 to the brake cylinders 29, to apply the brakes in the conventional manner.

On the release of the brake pedal 30, the pressure on the fluid is relieved and it returns to the master cylinder 28 in the normal way.

When the device is to be utilized for the prevention of the unauthorized removal of the vehicle, immediately before stopping the vehicle, the cylinder of the lock 24 is rotated in the reverse direction by means of the key 26. The valve head 13 together with its stem 12 will follow the movement of the screw-threaded spigot 25 under the action of spring 23 and cause the valve head with its sealing ring 14 to seat on the seating 11. Whenever the brakes are applied by depression of the brake pedal 30, fluid under pressure will be supplied from the master cylinder 28 to the inlet port 17 of the body 5, the pressure of the fluid will now unseat the valve head 13 and the fluid will flow out of the outlet port 22 to the brake cylinders 29 to apply the brakes 31.

On pressure on the brake pedal 30 being relieved, the valve head 13 will close under the action of the compression spring 23, and the fluid under pressure on the outlet side of the device, i.e. in the section of the system in communication with the brake cylinders 29, will be trapped therein and the brakes will be locked, rotation of the wheels of the vehicle being prevented.

The only way in which the brakes can be unlocked, is to move the spigot 25 forward by means of the appropriate key 26, by rotating the lock cylinder 24 in the said one direction for the requisite revolution, which moves the spigot 25 forward to unseat the valve head 13 and relieve the pressure on the outlet side of the device, i.e. within the brake cylinders 29.

The normal application of the brakes during stopping of the vehicle may be relied upon to lock the brakes against the unauthorized removal thereof, when the device is set with the valve head 13 in its seated position. However, in order to ensure that the brakes 31 are positively locked, the brake pedal 30 may be further depressed when the vehicle is stationary, or subject to a number of depressing strokes, so as to pump more fluid into the brake cylinders 29 and ensure that the brake fluid within the latter is at a sufficiently high pressure to positively apply the brakes and lock the wheels.

In the event of the pressure becoming excessive in the brake cylinders 27 when the valve head 13 is in its seated position, and the brake shoes 31 are in their locked or "on" position, fluid can leak through the passageway 15 in the valve head overcoming the pressure exerted by the compression spring 18 on the one-way valve member 16, allowing the fluid to bleed away through the radial hole 17 into the passageway 6 and relieve the pressure on the brake cylinders 29.

The example described above may be modified and improved as shown in FIG. 5.

In this modification the body portion 5 is similar to that shown in FIGS. 1 and 2 but between the portion engaged by the seal 20 and the right-hand end there is a radially extending aperture 42, communicating with the internally enlarged right-hand end which right-hand end accommodates the cylinder lock 24 as in the FIG. 2 embodiment. The cylinder lock comprises a casing 44 and a cylinder 39 rotatable therein. In use the cylinder 39 is connected to the spigot 25 as before.

The sleeve 44 has a slot 45 therein, and when the lock is in position in body portion 5, an electric switch 43 can be mounted on the body portion 25 so that a plunger control 41 of the switch passes through aperture 42 and slot 45 to abut the cylinder 39. Where the plunger abuts the cylinder the cylinder is cut away to provide a cam surface 40. Thus when the cylinder of the lock is rotated by the key, the plunger 41 rides up onto the cylindrical portion of the cylinder 24 and is hence pressed into the switch 43, actuating the switch. This enables the device to give further protection against unauthorized removal of the vehicle to which it is fitted, for example in the following manner:

The switch is a two-position switch and in one position, with the plunger out, terminals B and C are connected while with the plunger in, terminals A and D are connected (i.e. the switch is a double-pole single-throw switch). Thus a wire in the ignition circuit may be bypassed through terminals B and C, while a wire in an alarm circuit, which circuit includes the starter switch (e.g. a tapoff wire from the starter switch to starter solenoid connection passing through a horn to earth) may be bypassed through terminals A and D. When the lock is turned to seat valve head 13 on its seating so that the brakes may be locked, the plunger 41 is depressed, the connection between B and C is broken, rendering the ignition inoperative, while a connection between A and D is made, so that should an unauthorized person turn the starter switch, the horn will sound.

The invention is not limited to the foregoing examples, for instance the spring 23 may be omitted, fluid pressure serving to seat the valve head on the valve seating.

This invention may, for example, be applied to a motor vehicle having a mobile platform which may be raised and lowered, as an additional safety means for preventing the involuntary movement of the vehicle, in the event, for instance, of the failure of the handbrake.

I claim:

1. In a hydraulic brake system of a vehicle having a master cylinder and brake cylinders, between the master cylinder and the brake cylinders, a device for preventing the unauthorized movement of the vehicle comprising:

a. a body portion having a through passageway, an inlet in the body portion to the passageway intermediate the ends of the passageway, the master cylinder communicating with the said inlet, and a valve seating between said inlet and one of the ends of the passageway, the said one end communicating with the brake cylinders of the vehicle and the other end of the passageway having a screw thread and a radial aperture, b. a valve member having a head and a stem and arranged slidably within the said passageway of the body portion so that the valve head may seat on the side of the valve seating which is remote from the said inlet, with the valve stem extending past the seating and the inlet, the valve head comprising a cap of plastics material fitted onto the valve stem and having an aperture communicating with a bore in the valve stem which bore has an exit hole communicating with the said passageway, c. a screw-threaded member screwed into the said other end of the passageway so that it abuts the end of said valve stem when said valve head is seated on said valve seating, d. a cylinder lock mounted in the said other end of the passageway and comprising a sleeve and a cylinder rotatable in the sleeve by means of a key, the sleeve having a radial aperture therein registering with the radial aperture in the said other end of the passageway and the cylinder having a cam surface registering with the said radial aperture in the sleeve, the screw-threaded member being rotatable with the cylinder to screw further into the passageway and move the valve head off its seating, e. a fluidtight seal for the said other end of the passageway, f. a second valve member including a ball portion located within the bore in the valve stem, g. a spring within the valve stem which normally urges the ball portion of the said second valve member against the said aperture in the valve head to seal the said aperture, but which permits the passage of excess brake fluid in the direction from the brake cylinders to the master cylinder, and h. a plunger-operated electric switch mounted on the body portion with the plunger passing through the radial apertures in the said one end of the passageway and the lock sleeve to abut the cam surface, so that when the lock cylinder is rotated the plunger will be actuated.

2. A device as claimed in claim 1 in which the switch is a double-pole single-throw switch.

3. A device as claimed in claim 1 including a spring arranged within the said passageway in the body portion to urge the said valve head onto the said valve seating.

4. A device as claimed in claim 1 in which the said plastics material comprises an acetal resin.

5. A device as claimed in claim 1 in which the said plastics material comprises a reinforced polyamide plastic.

6. In a hydraulic brake system of a vehicle having a master cylinder and brake cylinders, between the master cylinder and the brake cylinders, a device for preventing the unauthorized movement of the vehicle comprising:

a. a body portion having a through passageway with screw-threaded ends, an inlet in the body portion to the passageway intermediate said ends, the master cylinder communicating with said inlet, and a valve seating between said inlet and one of the ends of the passageway, the other end of the passageway having a radial aperture therein, b. a valve member having a head, a stem, and a sealing ring surrounding the root of the stem and abutting the head, the member being arranged slidably within the said passageway of the body portion so that the valve head may seat on the side of the valve seating which is remote from the said inlet, with the sealing ring interposed between the head and the seating and the valve stem extending past the seating and the inlet, the valve head comprising a cap of plastics material having a screw thread and being screwed onto a corresponding screw thread on the root of the stem, the cap also having an aperture communicating with a bore in the valve stem which bore has a radial exit hole communicating with the said passageway, c. a screw-threaded plug screwed into the said one end of the passageway and having a through bore communicating at the inner end with the passageway and at the outer end with the brake cylinders, d. a fluidtight seal between the said plug and the wall of the said one end of the passageway, e. a screw-threaded member screwed into the said other end of the passageway so that it abuts the end of said valve stem when said valve head is seated on said valve seating, f. a cylinder lock mounted in the said other end of the passageway and comprising a sleeve and a cylinder rotatable in the sleeve by means of a key, the sleeve having a radial aperture therein registering with the radial aperture in the said other end of the passageway and the cylinder having a cam surface registering with the said radial aperture in the sleeve, the screw-threaded member being rotatable with the cylinder to screw further into the passageway and move the valve head off its seating, g. a fluidtight sealing member for the said other end of the passageway fitted around the valve stem intermediate the exit hole of the said bore in the valve stem and the said other end of the passageway, h. a second valve member including a ball portion located within the bore in the valve stem, i. a spring within the valve stem which normally urges the ball portion of the said second valve member against the said aperture in the valve head to seal the said aperture, but which permits the passage of excess brake fluid in the direction from the brake cylinders to the master cylinder, and j. a plunger operated electric switch mounted on the body portion with the plunger passing through the radial apertures in the said one end of the passageway and the lock sleeve to abut the cam surface, so that when the lock cylinder is rotated the plunger will be actuated.

7. A device as claimed in claim 6, in which the switch is a double-pole single-throw switch.

8. A device as claimed in claim 6 in which the said screw-threaded plug has a seating for a compression spring at its inner end, and in which the device includes a compression spring seating at one end on the spring seating of the plug and at its other end against the said valve head to urge the valve head onto the said valve seating.

9. A device as claimed in claim 6 in which the said plastics material comprises an acetal resin.

10. A device as claimed in claim 6 in which the said plastics material comprises a reinforced polyamide plastic.

* * * * *